United States Patent
Pal et al.

(10) Patent No.: US 11,002,269 B2
(45) Date of Patent: May 11, 2021

(54) REAL TIME MACHINE LEARNING BASED PREDICTIVE AND PREVENTIVE MAINTENANCE OF VACUUM PUMP

(71) Applicant: MachineSense, LLC, Baltimore, MD (US)

(72) Inventors: Biplab Pal, Ellicott City, MD (US); Steven Gillmeister, Baltimore, MD (US); Amit Purohit, Thane West (IN)

(73) Assignee: MachineSense, LLC, Baltimore, MD (US)

( * ) Notice: Subject to any disclaimer, the term of this patent is extended or adjusted under 35 U.S.C. 154(b) by 0 days.

(21) Appl. No.: 16/253,462

(22) Filed: Jan. 22, 2019

(65) Prior Publication Data

US 2019/0154032 A1 May 23, 2019

Related U.S. Application Data

(63) Continuation of application No. 14/628,322, filed on Feb. 23, 2015, now abandoned.

(51) Int. Cl.
*F04B 51/00* (2006.01)
*G01M 3/02* (2006.01)
*G01M 3/26* (2006.01)

(52) U.S. Cl.
CPC ............ *F04B 51/00* (2013.01); *G01M 3/025* (2013.01); *G01M 3/26* (2013.01)

(58) Field of Classification Search
None
See application file for complete search history.

(56) References Cited

U.S. PATENT DOCUMENTS

| 4,023,940 A | 5/1977 | Shultz |
| 4,131,011 A | 12/1978 | Ling |

(Continued)

FOREIGN PATENT DOCUMENTS

| CN | 201672991 | 12/2010 |
| CN | 102539911 A | 7/2012 |

(Continued)

OTHER PUBLICATIONS

Vasudevan, Shobha, "Still a Fight to Get It Right: Verification in the Era of Machine Learning", 2017 IEEE International Conference on Rebooting Computing (ICRC), Washington, DC, 2017, pp. 1-8. (Year: 2017).*

(Continued)

*Primary Examiner* — Roy Y Yi
(74) *Attorney, Agent, or Firm* — Fox Rothschild LLP

(57) ABSTRACT

A method and system of a machine learning architecture for predictive and preventive maintenance of vacuum pumps. The method includes receiving one of a motor sensor data and a blower sensor data over a communications network. The motor sensor data is classified into one of a vacuum state sensor data and break state sensor data. The vacuum state sensor data is analyzed to detect an operating vacuum level and an alarm is raised when the vacuum state sensor data exceeds a pre-defined safety range. Vacuum break data is classified into one of a clean filter category and clogged filter category and an alarm is raised if an entry under the clogged filter category is detected. The blower sensor data in association with the motor sensor data is analyzed based on machine learning to detect one of a deficient oil level and a deficient oil structure.

21 Claims, 24 Drawing Sheets

(56) References Cited

U.S. PATENT DOCUMENTS

| | | |
|---|---|---|
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |
| 6,289,606 B2 | 9/2001 | Gillette et al. |
| 6,330,525 B1 * | 12/2001 | Hays ................ F04D 15/0088 702/183 |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0049834 A1 * | 3/2005 | Bottomfield ....... G05B 23/0229 702/183 |
| 2005/0222794 A1 | 10/2005 | Baird et al. |
| 2006/0137105 A1 | 6/2006 | Hong et al. |
| 2006/0168195 A1 | 7/2006 | Maturana et al. |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis et al. |
| 2008/0109185 A1 | 5/2008 | Cheung et al. |
| 2008/0289045 A1 | 11/2008 | Fryer |
| 2008/0294382 A1 * | 11/2008 | Lim .................. H01L 21/67288 702/185 |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1 | 9/2015 | Blevins |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | |
|---|---|---|
| CN | 103399486 A | 11/2013 |
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

International Search Report and Written Opinion for PCT Application No. PCT/US16/18820; dated Aug. 4, 2016.

International Search Report and Written Opinion for PCT Application No. PCT/US15/066547; dated Mar. 17, 2016.

Sensors Drive Mobile IoT; Wong, William; Jan. 26, 2015; Electronic Design.

(56) References Cited

OTHER PUBLICATIONS

International Search Report and Written Opinion for PCT Application No. PCT/US16/028724; dated Aug. 22, 2016.
International Search Report and Written Opinion for PCT Application No. PCT/US16/18831; dated Aug. 12, 2016.
Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/B978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.

\* cited by examiner

REAL TIME MACHINE LEARNING BASED PREDICTIVE AND PREVENTIVE MAINTENANCE OF VACUUM PUMP

CROSS REFERENCE TO RELATED PATENT APPLICATION

This patent application is a 35 USC 120 continuation of co-pending U.S. patent application Ser. No. 14/628,322, filed 23 Feb. 2015, published as United States patent publication 2016/0245279 on 25 Aug. 2016, with the inventors named as Biplab Pal, Steve Gillmeister, and Amit Purohit, and further filed with those inventors named as the Applicants. This patent application claims the benefit of the priority of the '322 application under 35 USC 120.

FIELD OF TECHNOLOGY

The present invention generally relates to Internet of Things (IoT), and more particularly relates to an IoT-based system for predictive and preventive maintenance of machines that uses a blower and a pump, through machine learning and physics based modeling of physical parameters like vibration, sound, temperature monitored by machine wearable and other related sensors.

BACKGROUND

Internet of Things (IoT) is a network of uniquely-identifiable and purposed "things" that are enabled to communicate data over a communications network without requiring human-to-human or human-to-computer interaction. The "thing" in the Internet of Things may virtually be anything that fits into a common purpose thereof. For example, a "thing" could be a person with a heart rate monitor implant, a farm animal with a biochip transponder, an automobile comprising built-in sensors configured to alert its driver when the tire pressure is low, or the like, or any other natural or man-made entity that can be assigned with a unique IP address and provided with the ability to transfer data over a network. Notably, if all the entities in an IoT are machines, then the IoT is referred to as a Machine to Machine (M2M) IoT or simply, as M2M IoT.

It is apparent from the aforementioned examples that an entity becomes a "thing" of an M2M IoT especially, when the entity is attached with one or more sensors capable of capturing one or more types of data pertaining to: segregation of the data (if applicable); selective communication of each segregation of data to one or more fellow "things"; reception of one or more control commands (or instructions) from one or more fellow "things" wherein, the control commands are based on the data received by the one or more fellow "things"; and execution of the commands resulting in manipulation or "management" of an operation of the corresponding entity. Therefore, in an IoT-enabled system, the "things" basically manage themselves without any human intervention, thus drastically improving the efficiency thereof.

EP Patent No. 1836576 B1 discusses a diagnostic method of failure protection of vacuum pumps. Based on comparison of the currently evaluated diagnostics analysis results and an initial data, maintenance engineers would decide the replacement of the considered vacuum pump, according to the evaluated pump performance indicators. However, in this prior art invention, there is no mention of machine learning or use of machine wearable sensors. Also, the remedial decisions are left to the maintenance engineers.

US Patent application 20120209569 A1 discusses a method for predicting a failure in rotation of a rotor of a vacuum pump. The prior art invention fails to disclose machine learning capabilities and also is dependent on an observation time prediction window. Further, the prior art fails to disclose machine wearable sensors and Internet of things.

U.S. Pat. No. 7,882,394 B2 discusses fault diagnostics through a data collection module. The prior art discloses a system for condition monitoring and fault diagnosis that includes: a data collection function that acquires time histories of selected variables for one or more of components; a pre-processing function that calculates specified characteristics of time histories; an analysis function for evaluating the characteristics to produce one or more hypotheses of a condition of the components, and a reasoning function for determining the condition of the components from one or more hypotheses. The prior art invention however, fails to suggest the concept of IoT. Further, the prior art invention does not mention machine learning for effective predictive or preventive maintenance of vacuum pumps or similar devices.

It is evident from the discussion of the aforementioned prior art that none of them discloses or suggests regarding predictive and preventive maintenance of vacuum pumps through machine learning. Therefore, there is a need in the art for a solution to the aforementioned problem.

SUMMARY OF THE INVENTION

A method of machine learning architecture according to the present invention includes a step of: receiving data from machine wearable sensors placed on a motor (henceforth motor sensor data) and a blower (henceforth a blower sensor data) over a communications network. The machine wearable sensors can be selected from a group consisting of vibration sensors, temperature sensors, magnetic field sensors, gyroscope and its combinations thereof. The sensor type can be single silicon or MEMS (Micro-electromechanical systems) type. The motor or blower sensor data is classified into one of a vacuum state sensor data and vacuum break state (where rotor is switched off and the revolution of the rotor is gradually damping in vacuum medium) sensor data, wherein the vacuum state sensor data is further analyzed to detect an operating vacuum level and an alarm is raised when the vacuum state sensor data exceeds a predefined safety range. The vacuum break state sensor data is then classified into clean filter category and clogged filter category and an alarm is raised if the real time data of sensors belonging to clogged filter category is detected. Vacuum state data is further classified based on a multi-class learning model which classifies a pump running with machine oil into clean, old, leaked or overfilled classes. If the sensor data suggest neither, it is classified under uncategorized bearing issues. The blower sensor data in association with the motor sensor data is analyzed based on machine learning to detect deficient oil level and deficient oil structure.

An IoT based machine learning architecture according to an embodiment of the present invention includes: a vacuum pump associated with a blower and a motor coupled with one or more machine wearable sensors; a communications network; and a mobile application associated with a mobile device. The mobile application is communicatively coupled to one or more machine wearable sensors, over the communications network. The mobile application can be replaced by a PC based communication such as a PC based app, as well. The machine learning architecture receives sensor data from the blower and the motor and classifies the motor sensor data into vacuum state sensor data and break state sensor data. Also, the machine learning architecture analyzes the vacuum state sensor data to detect an operating vacuum level and an alarm is raised when the vacuum state sensor data exceeds a pre-defined safety range. The machine learning architecture classifies vacuum break data into clean filter category and clogged filter category and an alarm is raised if an entry under the clogged filter category is detected, and the machine learning architecture further analyzes the blower sensor data in association with the motor sensor data through a machine learning algorithm in order to detect at least one of a deficient oil level and a deficient oil structure.

The present invention relates to an Internet of Things (IoT) based system for overseeing process control and predictive maintenance of a machine or a network of machines by employing machine wearable sensors. The IoT based system includes a plurality of machine-wearable sensors, secured to the exterior of the machine. These sensors can be any combination of Temperature sensors, Vibration sensors, Magnetometer, Gyroscope. Each sensor is capable of transmitting captured data wirelessly over a communications network. The IoT based system further includes a sensor network for receiving and transmitting the captured data over a communications network. The system also includes: a machine learning algorithm engine capable of receiving data from the sensor network and processing the received data to recognize one of a pattern and a deviation to issue an alarm and appropriate control commands pertaining to the machine. The system further includes one or more control modules disposed in operative communication with the control panel of the machine, wherein the control module is capable of receiving the control commands over a communications network and executing the control commands.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated in a non-limiting but in a way of example, in the figures of the accompanying drawings, in which like references indicate similar elements and in which.

DETAILED DESCRIPTION OF THE INVENTION

Example embodiments, as described below, may be used to provide a method, an apparatus and/or a system of real time machine learning based predictive and preventive maintenance of a vacuum pump. Although the present embodiments have been described with reference to specific exemplary embodiments, it will be evident that various modifications and changes may be made to these embodiments without departing from the broader spirit and scope of the invention.

Figure 1:
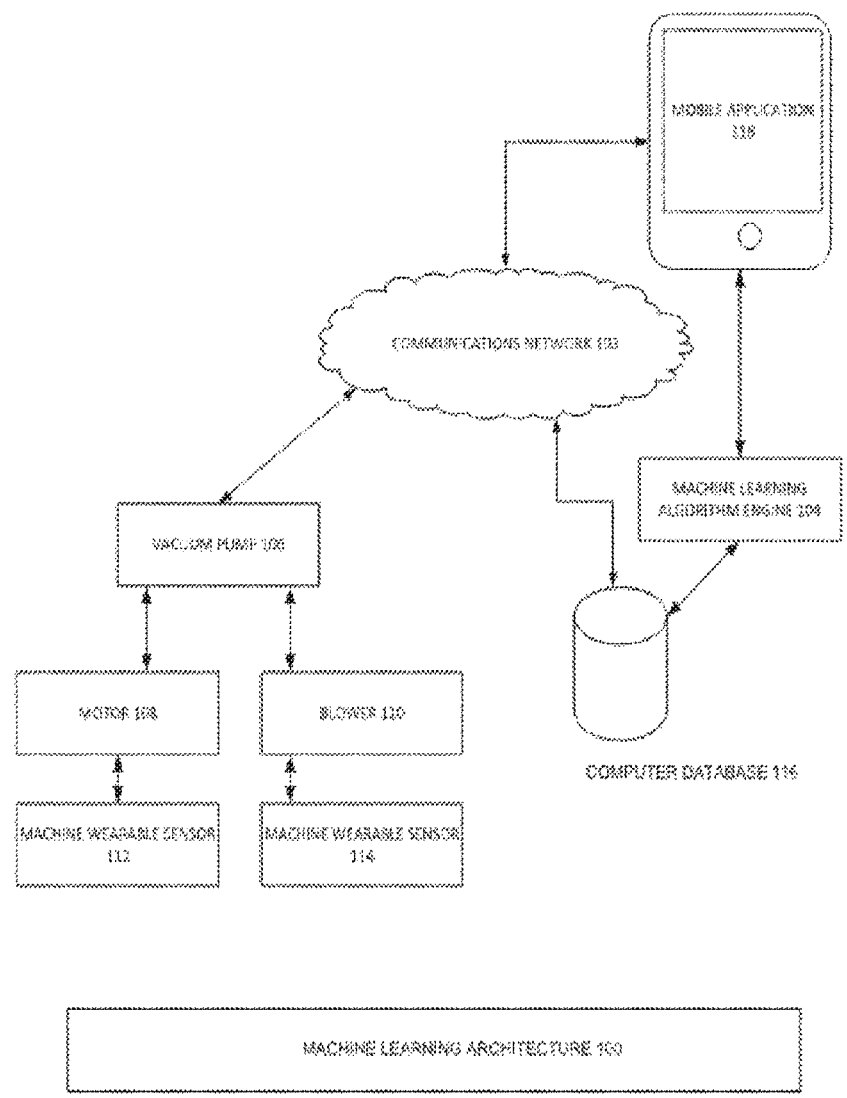
FIG. 1 is a diagrammatic representation of a machine learning architecture, according to one or more embodiments.

FIG. 1 is a system diagram of a machine learning architecture, according to one embodiment. The machine learning architecture 100 may include a vacuum pump 106 associated with a blower 110 and motor 108. The architecture 100 may include one or more machine wearable sensors 114, 112 coupled respectively to the blower 110 and the motor 108 of the vacuum pump, a communications network 102, and a mobile application 118 associated with a mobile device. The mobile application 118 may be communicatively coupled to the machine wearable sensors 112, 114 over the communications network 102. The machine learning architecture 100 may receive sensor data from the blower 110 and the motor 108 and classifies the motor sensor data into vacuum state sensor data and break state sensor data. The machine learning architecture 100 analyzes the vacuum state sensor data to detect an operating vacuum level and an alarm is raised when the vacuum state sensor data exceeds a pre-defined safety range. A computer database 116 in communication with the mobile application 118 through the communication network 102 and machine learning algorithm engine 104. The machine learning architecture 100 classifies vacuum break data into clean filter category and clogged filter category and an alarm is raised if an entry under the clogged filter category is detected. The machine learning architecture 100 analyzes the blower sensor data in association with the motor sensor data through a machine learning algorithm in order to detect a deficient oil level and a deficient oil structure.

In one or more embodiments, the motor sensor data may be determined from a machine wearable sensor placed on the motor. Similarly, the blower sensor data may also be determined from a machine wearable sensor placed on the blower. The communications network may include WiFi, 2G, 3G, 4G, GPRS, EDGE, Bluetooth, ZigBee, Piconet of BLE, Zwave, or a combination thereof.

In one or more embodiments, the machine learning architecture may be associated with a machine learning algorithm. The motor sensor data and blower sensor data may be received over a communications network onto a mobile application coupled to a mobile device. The alarm may be raised over the communications network through one of a notification on the mobile application including short message service (SMS), email, or a combination thereof.

In one or more embodiments, machine learning of a vibrational data may comprise of information related to shape factor of the vibration calculated as a ratio of moving RMS (root mean square) value to moving average of absolute value.

Figure 2:
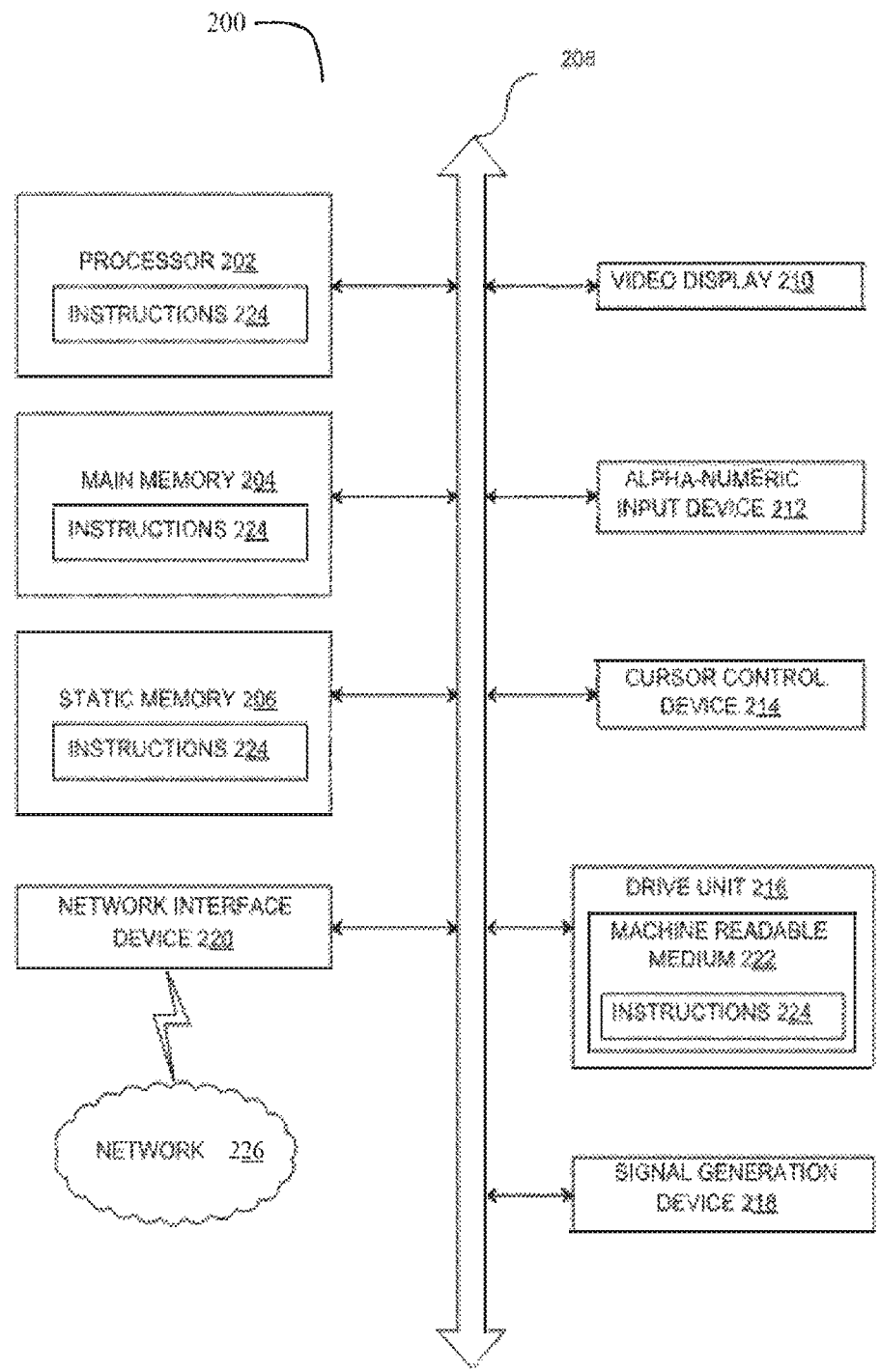
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein. FIG. 2 shows a diagrammatic representation of a machine in the exemplary form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or as a client machine in server-client network environment, and or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The exemplary computer system 200 includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 further includes a machine-readable medium 222 on which one or more sets of instructions 224 (e.g., software) embodying any one or more of the methodologies and/or functions described herein is stored. The instructions 224 may also reside, completely and/or at least partially, within the main memory 204 and/or within the processor 202 during execution thereof by the computer system 200. The main memory 204 and the processor 202 also constituting machine-readable media.

The instructions 224 may further be transmitted and/or received over a network 226 via the network interface device 220. While the machine-readable medium 222 is shown in an exemplary embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that causes the machine to perform any one or more of the methodologies of the various embodiments. The term "machine-readable medium" shall accordingly be taken to include, but not be limited to, solid-state memories, optical and magnetic media, and carrier wave signals.

Figure 3:
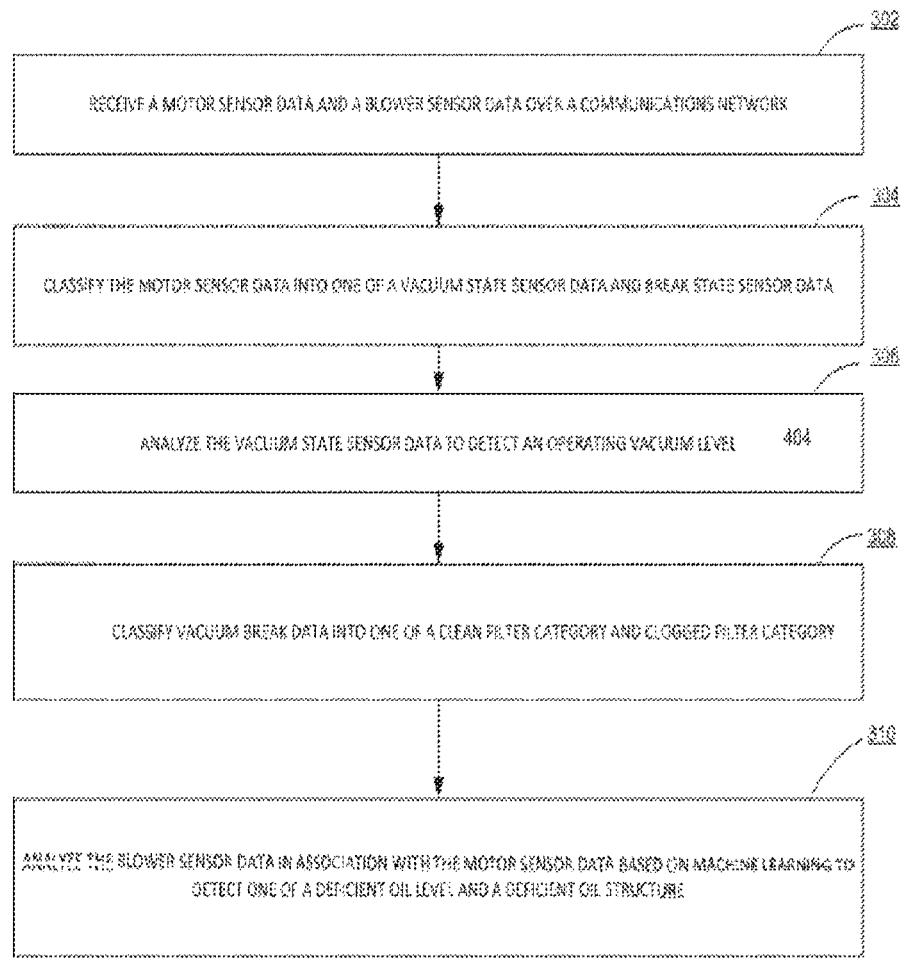
FIG. 3 is a process flow diagram detailing the operations of a method of a machine learning architecture, according to one or more embodiments.

FIG. 3 is a process flow diagram detailing the operations of one of a method of the machine learning architecture, according to one or more embodiments. In one embodiment, the method of machine learning architecture includes: receiving a motor sensor data and a blower sensor data over a communications network 302; classifying the motor sensor data into one of a vacuum state sensor data and break state sensor data 304; and analyzing the vacuum state sensor data to detect an operating vacuum level 306 and an alarm is raised when the vacuum state sensor data exceeds a pre-defined safety range. Further, the method includes classifying vacuum break data into clean filter category and clogged filter category 308 and an alarm is raised if an entry under the clogged filter category is detected. Also, the method includes analyzing the blower sensor data in association with the motor sensor data based on machine learning to detect deficient oil level and deficient oil structure 310.

In one or more embodiments, the method of machine learning architecture may also include determining motor sensor data from machine wearable sensor placed on the motor and determining blower sensor data from machine wearable sensor placed on the blower.

In one or more embodiments, the communications network may include WiFi, 2G, 3G, 4G, GPRS, EDGE, Bluetooth, ZigBee, Piconet of BLE, Zwave, or a combination thereof. The machine learning architecture may be associated with a machine learning algorithm.

In one or more embodiments, the motor sensor data and blower sensor data may be received over a communications network onto a mobile application associated with a mobile device and an alarm may be raised over the communications network through one of a notification on the mobile application, short message service (SMS), email, or a combination thereof.

In an exemplary embodiment, the Internet of Things (IoT) based system may include machine wearable sensors. Further, the IoT system may be used for overseeing process control and predictive maintenance of a machine or a network of machines. The system may include a plurality of machine-wearable sensors, each of which is secured to the exterior of the machine. Each sensor may be capable of transmitting captured data wirelessly over a communications network. The system may further include a sensor network for receiving and transmitting the captured data over a communications network and a machine learning algorithm engine capable of receiving data from the sensor network. The machine learning algorithm engine may process the received data to recognize one of a pattern and a deviation to issue control commands pertaining to the machine. Lastly, the system may include one or more control modules disposed in operative communication with a control panel of the machine, wherein the control module is capable of receiving control commands over a communications network and executing the control commands.

In an exemplary embodiment, the machine learning algorithm engine may raise an alarm when one of a filter is clogged and deficient oil is detected, wherein the deficient oil may be one of a low oil level and an overused oil structure. The plurality of machine wearable sensors may include motor sensors and blower sensors. The machine learning algorithm engine associated with the IoT based system may issue commands based on a learning outcome from the motor sensor data and the blower sensor data. The learning outcome may be dependent on recognition of one of a pattern and deviation by the machine learning algorithm engine.

In an exemplary embodiment, the machine learning algorithm engine may include three layers which may be used for predictive and preventive maintenance of vacuum pump.

The machine learning algorithm engine may deploy three layers of supervised machine learning for predictive and preventive maintenance. Layer one of the supervised machine learning may receive vibration data from motor and/or blower, the vibration data may be classified into vacuum state and vacuum break state. In one or more embodiments, the vacuum break state may be a state in which vacuum is released periodically.

In layer two, a motor vibration data from vacuum state may be classified to detect operating vacuum level such as −8 inch or −12 inches of mercury. Then depending on a safety range (e.g.: between −7 to −12 inches of mercury), an alarm may be raised and conveyed to the users via a mobile application.

In layer three, vacuum break data may be classified into clean filter category and clogged filter category using a supervised machine learning. If the clog filter category is detected then an alarm may be raised.

Blower temperature and blower vibration data may be used for classification of a bad and/or low oil level. Bad oil level may increase the friction and thereby raise the surface temp of a blower. The machine learning based classification includes an oblique and/or support vector machine. Support vector machines may be supervised learning models with associated learning algorithms that analyze data and recognize patterns. The supervised learning models may be used for classification and regression analysis.

Motor vibration data may not be affected by bad oil. However, blower vibration data may get affected by bad oil. Therefore motor vibration data may be indicative of a particular vacuum pressure level. By comparing the blower data for good and bad oil using supervised machine learning, operation with bad oil may be detected.

Figure 4:
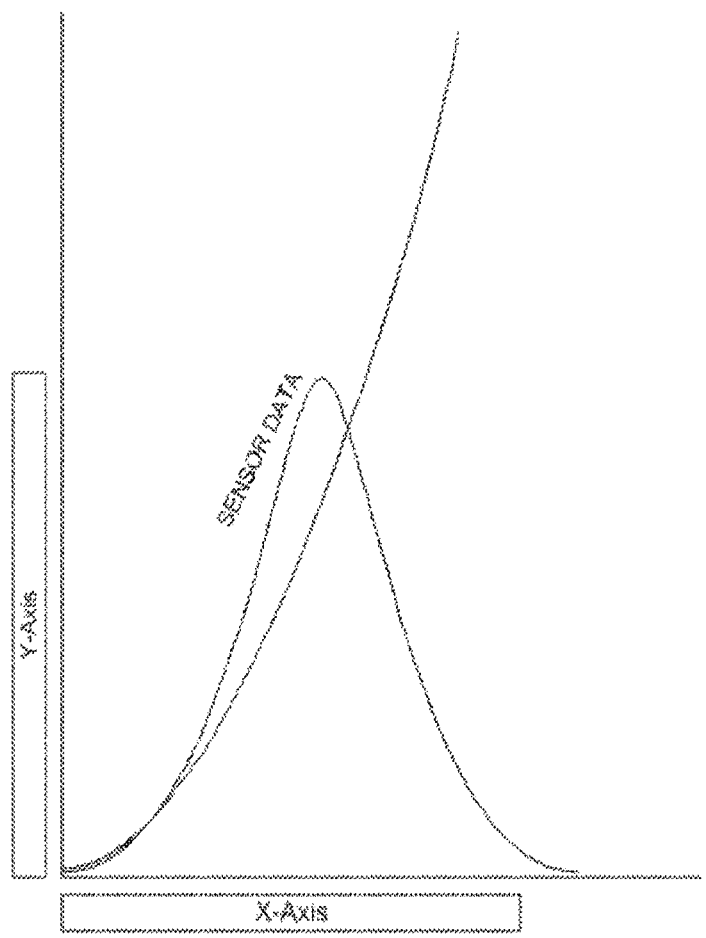
FIG. 4 is an exemplary representation of data on a mobile application associated with the machine learning architecture, according to one or more embodiments.

FIG. 4 is an exemplary representation of data on a mobile application associated with the machine learning architecture, according to one or more embodiments. FIG. 4 shows a sensor data representation on a mobile application associated with a mobile device.

Figure 5:
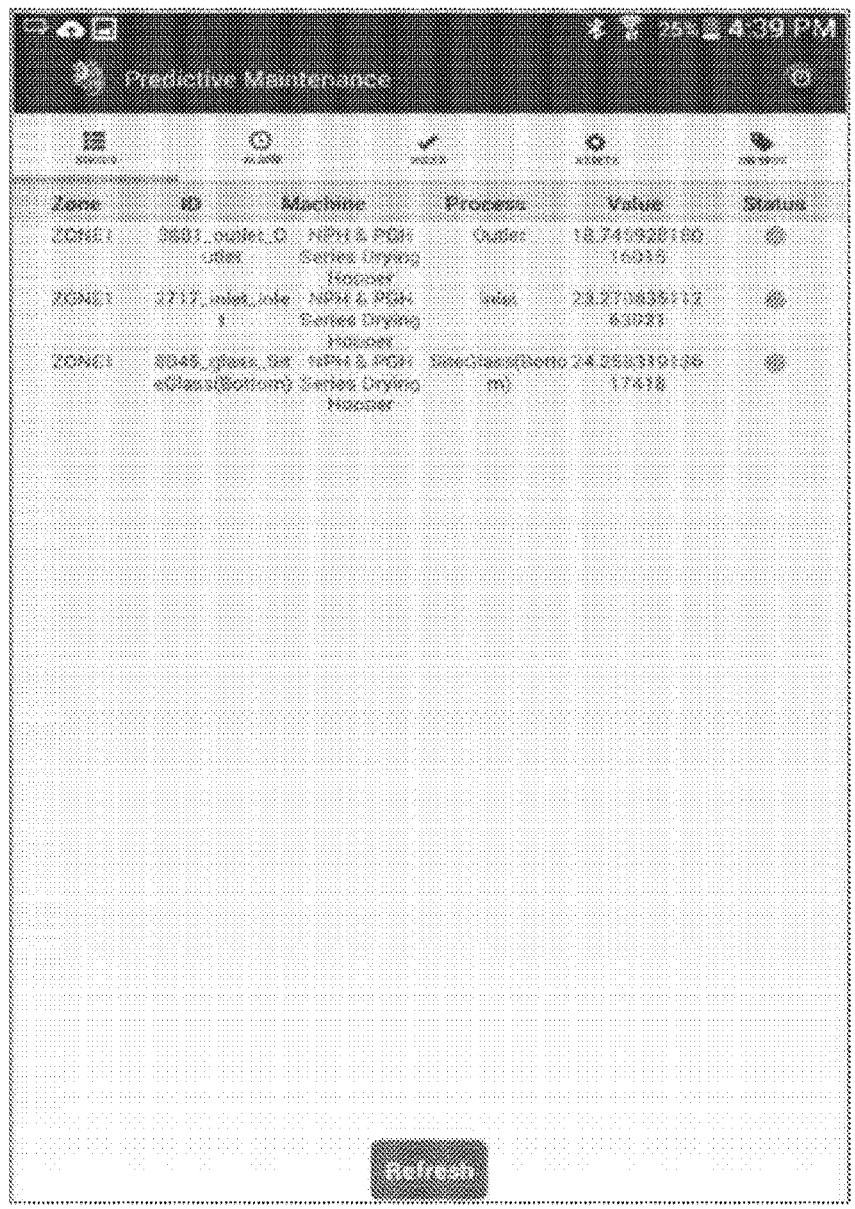
FIG. 5 is an exemplary representation of a mobile status dashboard for a dryer. The mobile status dashboard displays a status of a process anytime, anywhere through a connection with an internet.

FIG. 5 is an exemplary representation of a mobile status dashboard for a dryer. The mobile status dashboard displays a status of a process anytime, anywhere through a connection with an internet.

Figure 6:
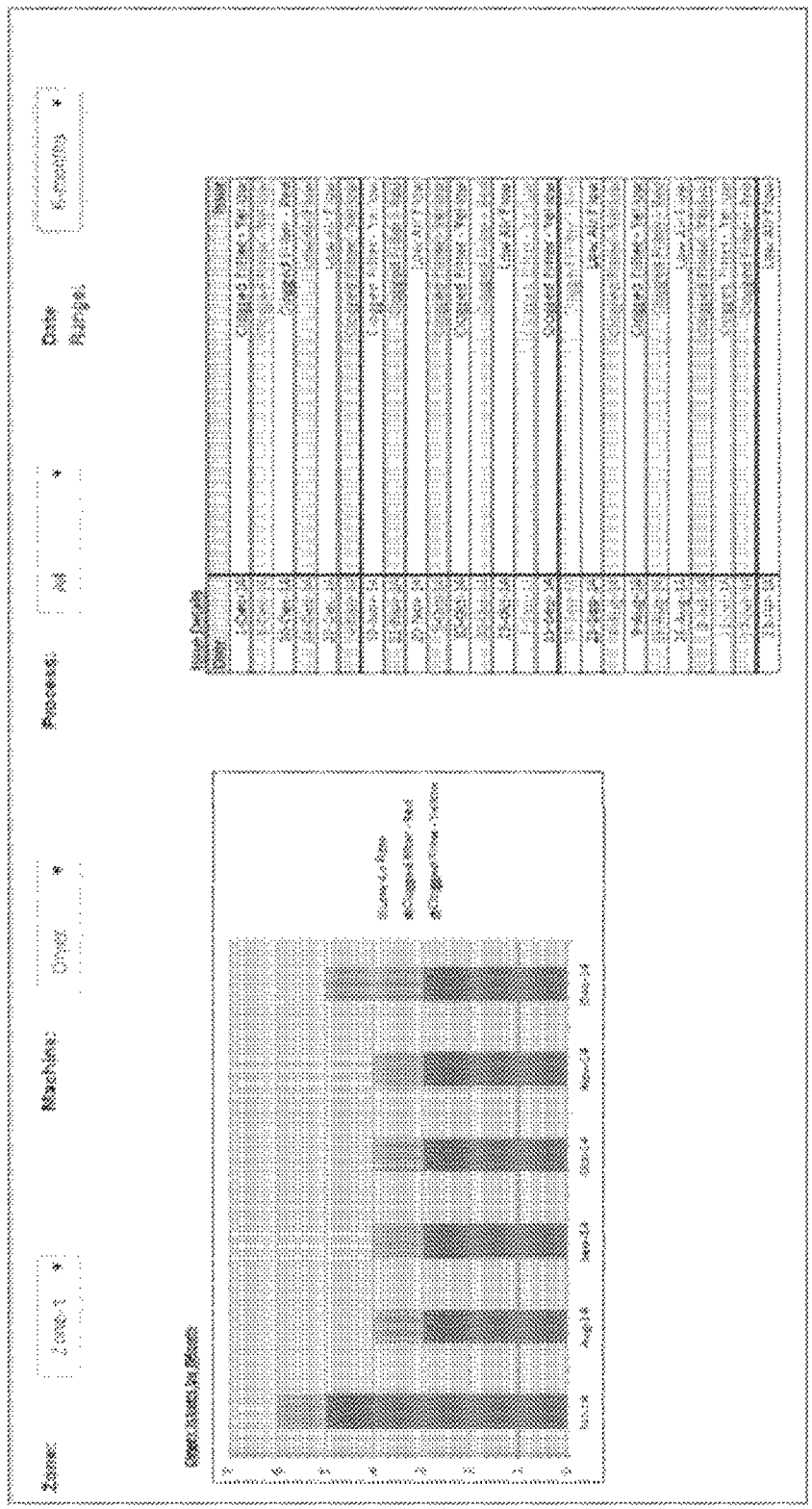
FIG. 6 is an exemplary representation of historical records of alarms/issues any time as displayed on a Mobile application associated with a mobile device generated automatically by a Dryer, according to one or more embodiments.

FIG. 6 is an exemplary representation of historical records of alarms/issues any time as displayed on a mobile application associated with a mobile device, generated automatically by a dryer, according to one or more embodiments.

Figure 7:
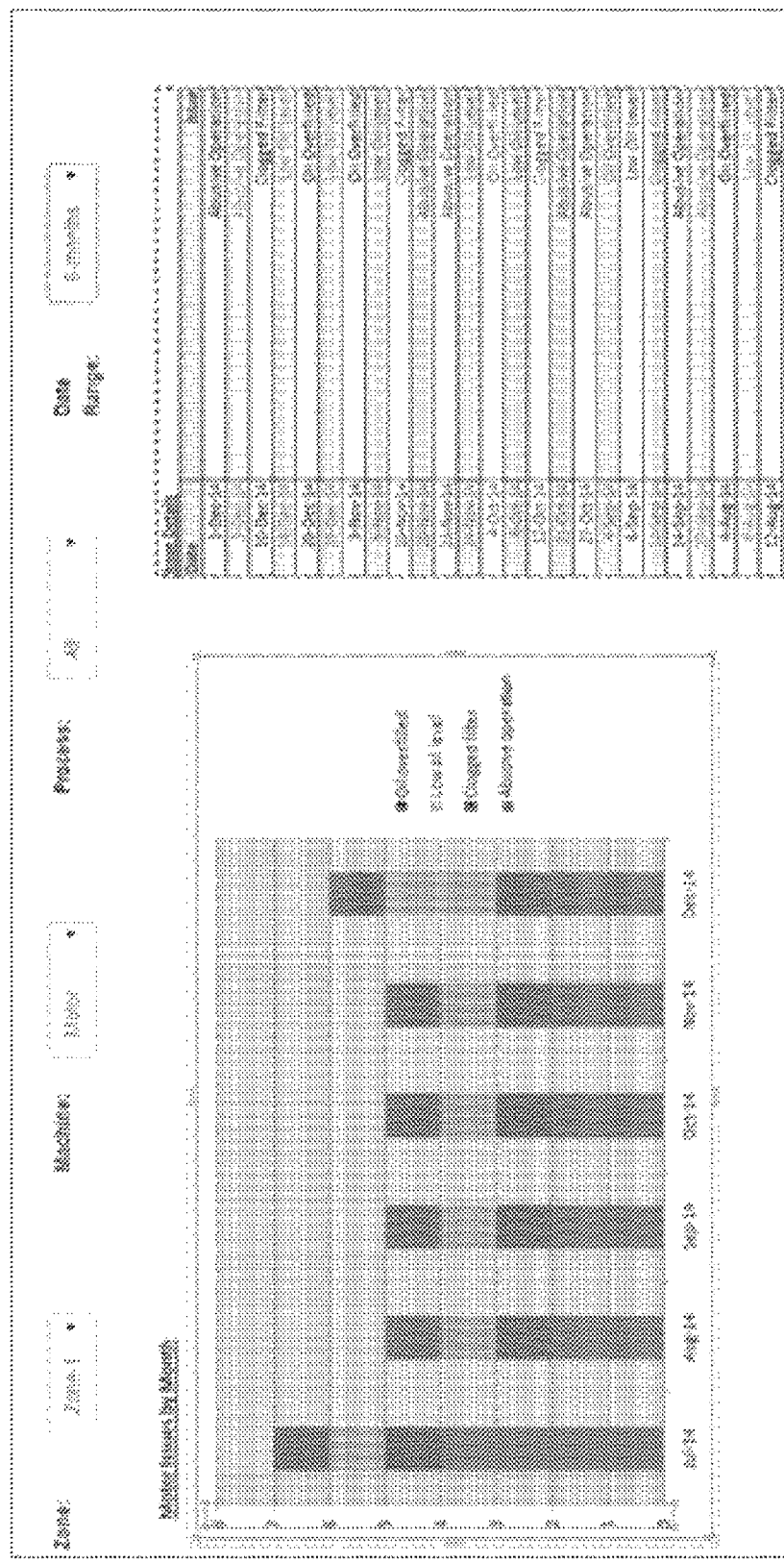
FIG. 7 is an exemplary representation of historical records of alarms/issues any time as displayed on a Mobile application associated with a mobile device generated automatically by a Vacuum pump, according to one or more embodiments.

FIG. 7 an exemplary representation of historical records of alarms/issues any time as displayed on a mobile application associated with a mobile device, generated automatically by a vacuum pump, according to one or more embodiments.

Figure 8:
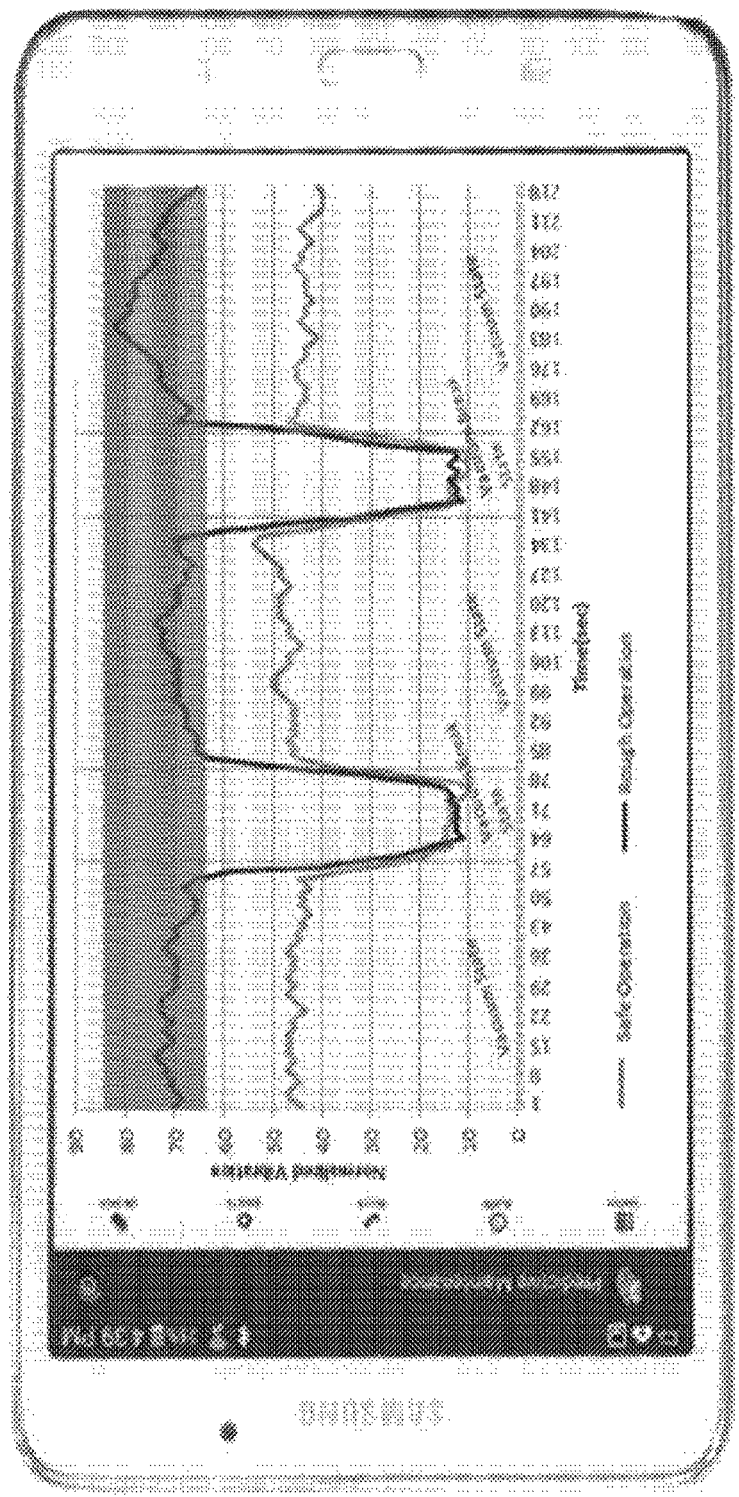
FIG. 8 is a representation of a mobile application tracking abusive operations for preventive maintenance so that pumps may last longer from real time vibration data, according to one embodiment.

FIG. 8 is a representation of a mobile application tracking abusive operations for preventive maintenance, according to one embodiment.

Figure 9:
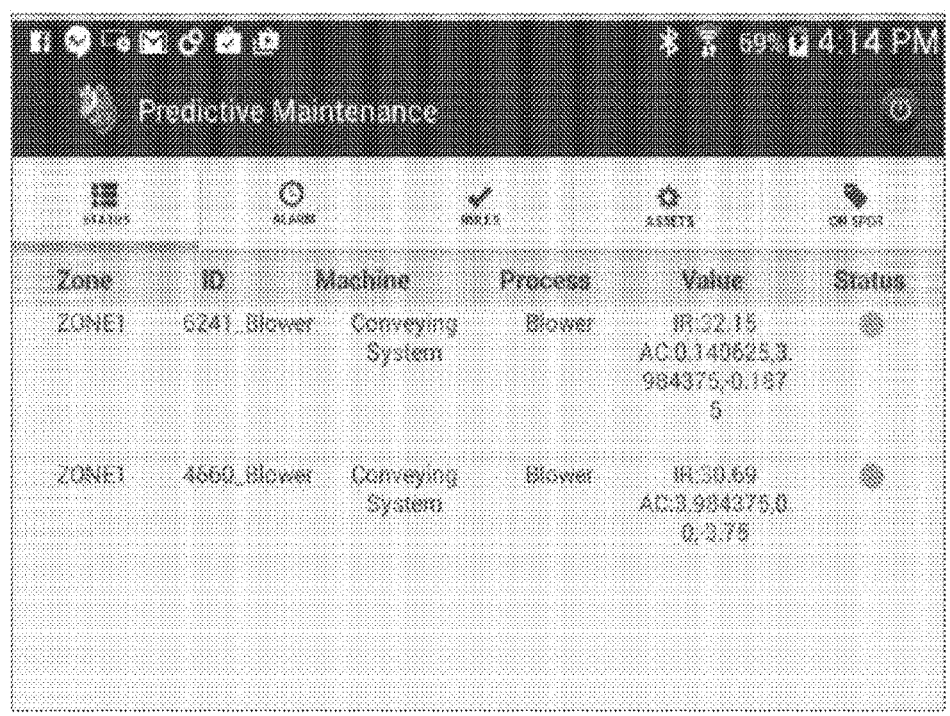
FIG. 9 is a representation of a real time status of a vacuum pump as seen on a mobile application, according to one embodiments.

FIG. 9 is a representation of a real time status of a vacuum pump as seen on a mobile application, according to one embodiment.

Figure 10:
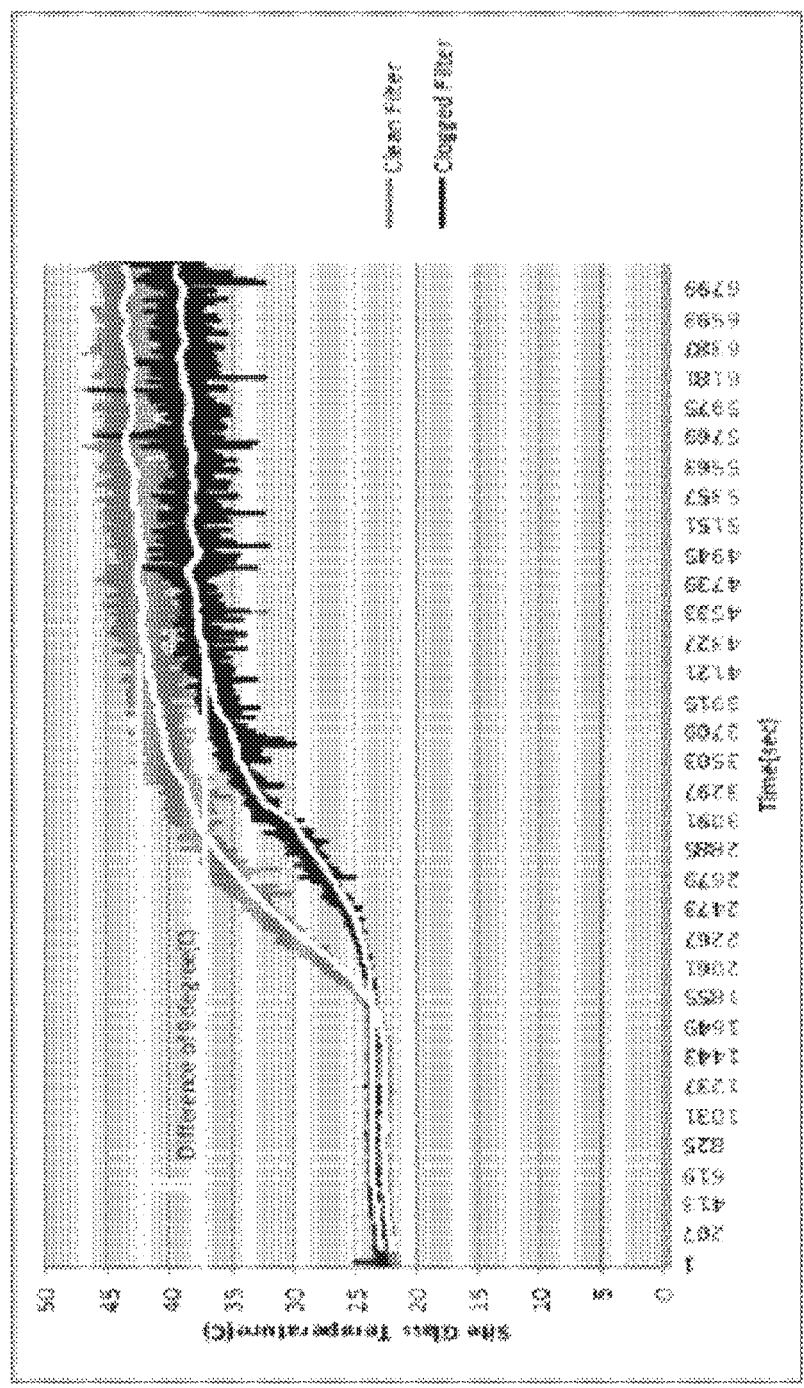
FIG. 10 is a representation of real time trend of drying-indicating clean dryer against dryers with clogged filter, according to one embodiment.

FIG. 10 is a representation of real time trend of drying-indicating clean dryer against dryers with clogged filter, according to one embodiment.

Figure 11:
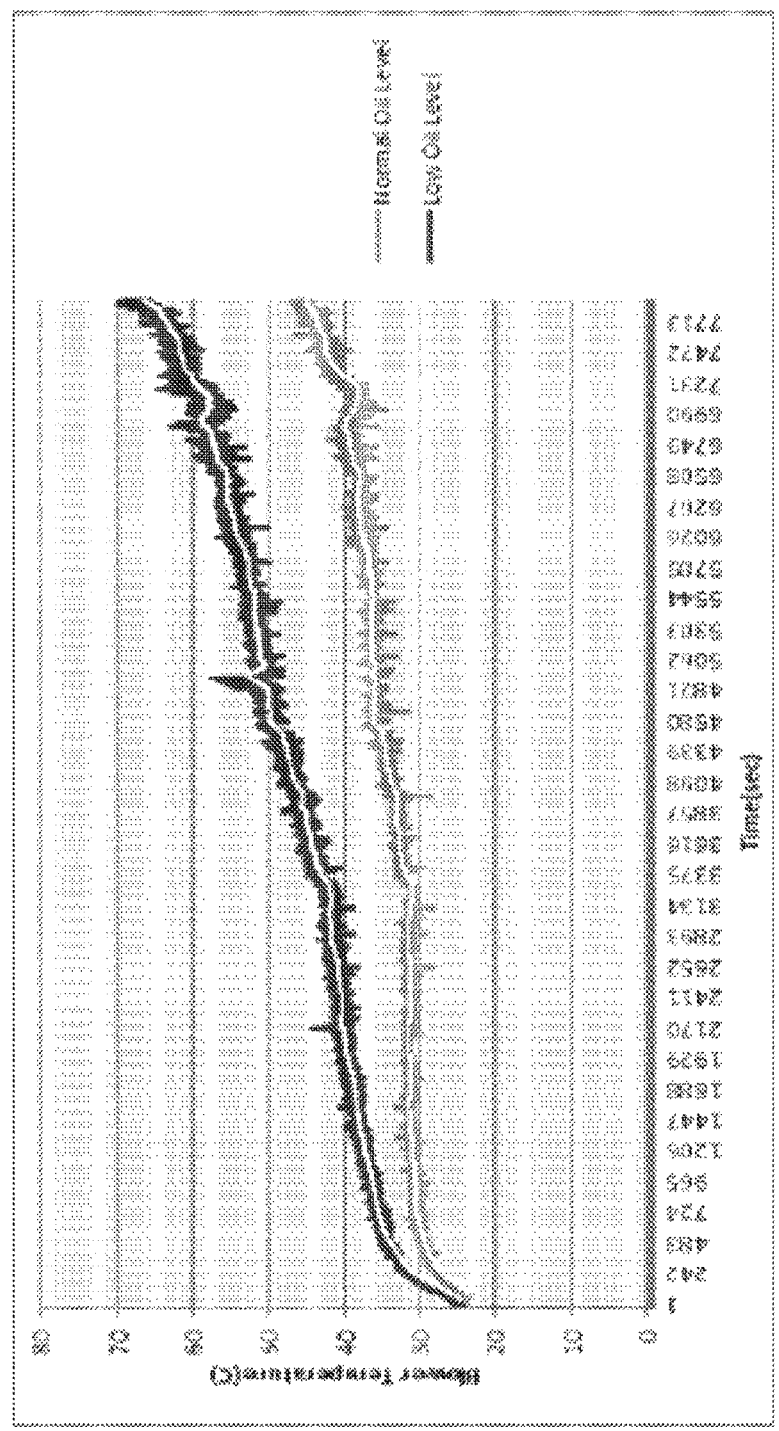
FIG. 11 is a representation of normal oil levels against low oil levels, according to one embodiment.

FIG. 11 is a representation of normal oil levels against low oil levels, according to one embodiment.

Figure 12:
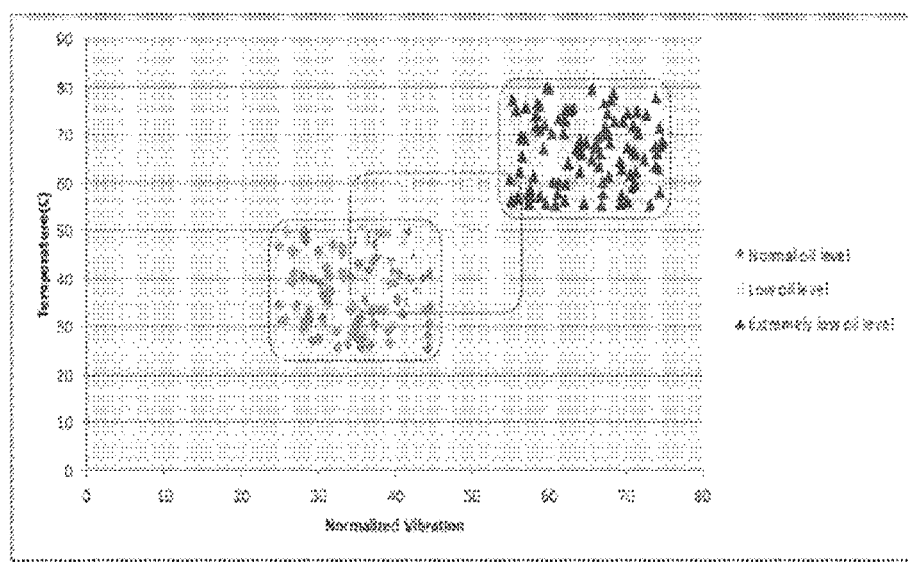
FIG. 12 is a clustering diagram showing pump temperature and vibration indicating different possible cluster of operation based on oil levels, according to one embodiment.

FIG. 12 is a clustering diagram showing pump temperature and vibration indicating different possible cluster of operation based on oil levels, according to one embodiment.

Pumps may run into failure very often due to abusive operation coupled with poor maintenance. Vacuum pumps may report one or more of temperature, vibration, pressure and sound. These data may be used by a platform to check against a baseline pump database and the platform offers early warning for pump failure and/or real time alarm for abusive operation. Similarly, a blower temperature along with vibration may also be tracked. From machine learning algorithms of data, the platform sends out early indication of clogging of safety filters and/or low oil level indication.

Figure 13:
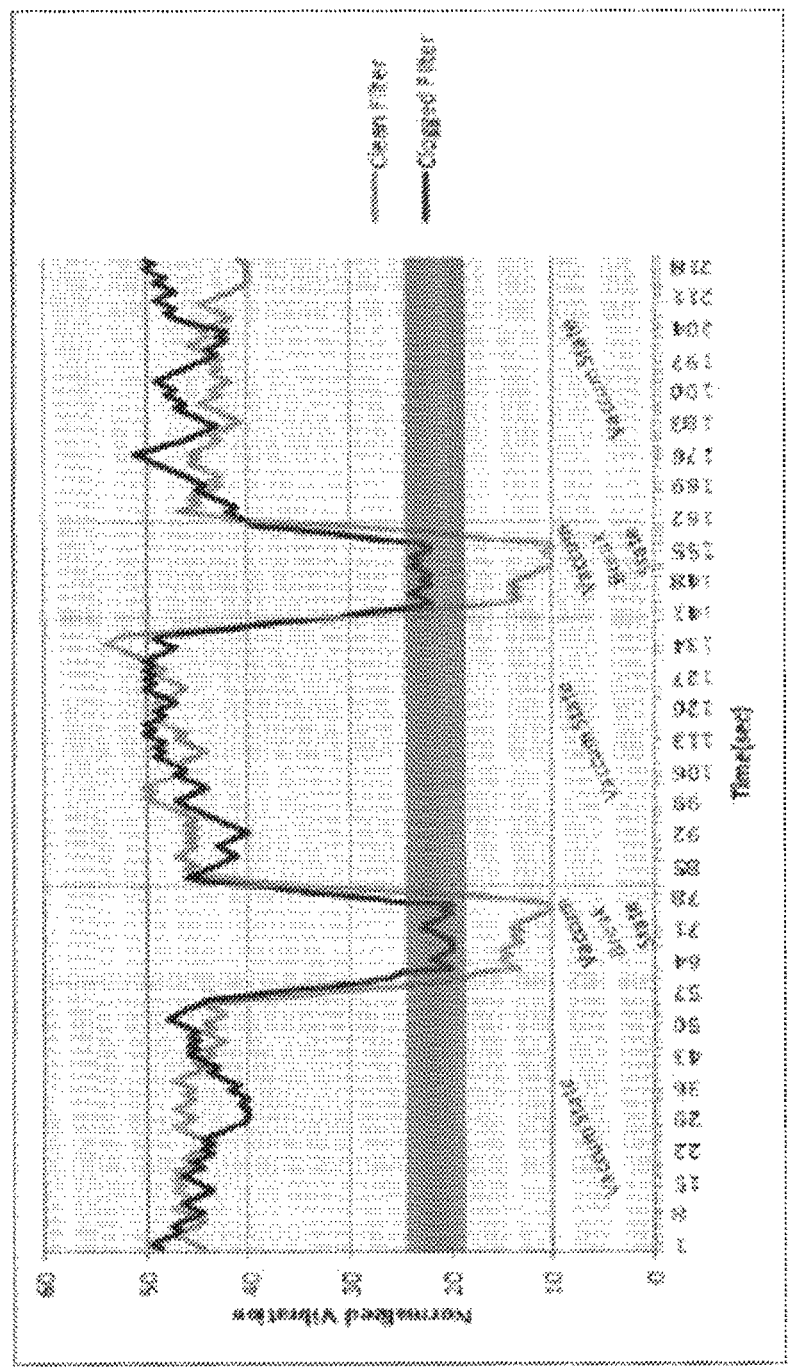
FIG. 13 is a representation of normalized vibration against time, according to one embodiment.

FIG. 13 is a representation of normalized vibration against time. Vibration data may help to identify clogged safety filter in a vacuum pump to stop abusive operation. Clogged safety filters may lead to malfunctioning of pump within months.

In an exemplary embodiment, a drying process with a check on health is available by tracking temperature and flow data at inlet, outlet and on a site glass of a dryer. A recorded database may be created for normal and/or baseline operation with a clean filter, By comparing with the baseline operation., a mobile application may indicate degradation of filters and drying process. The mobile application may also offer recommended operation for optimal temperature to save energy and may also act as a platform for dryer maintenance.

In one or more embodiments, a machine learning architecture may be associated with a machine learning algorithm where normal states of the vacuum pumps with operational range, clean filer and clean oil may be learned with a baseline reading. Further, anomalous readings from one of a clogged filter, a bad operation, a bad oil, a low oil level and an over filled oil level are also recorded. The baseline reading and the anomalous readings may be used as a training database for the machine learning algorithm.

In one or more embodiments, data from multiple vacuum pumps associated with machine wearable sensors may also be acquired. A mobile or web or desktop application may act as a mobile middleware to scale the machine learning architecture to a single data collection unit. The single data collection unit may be one of a mobile device and a wireless device.

Figure 14A:
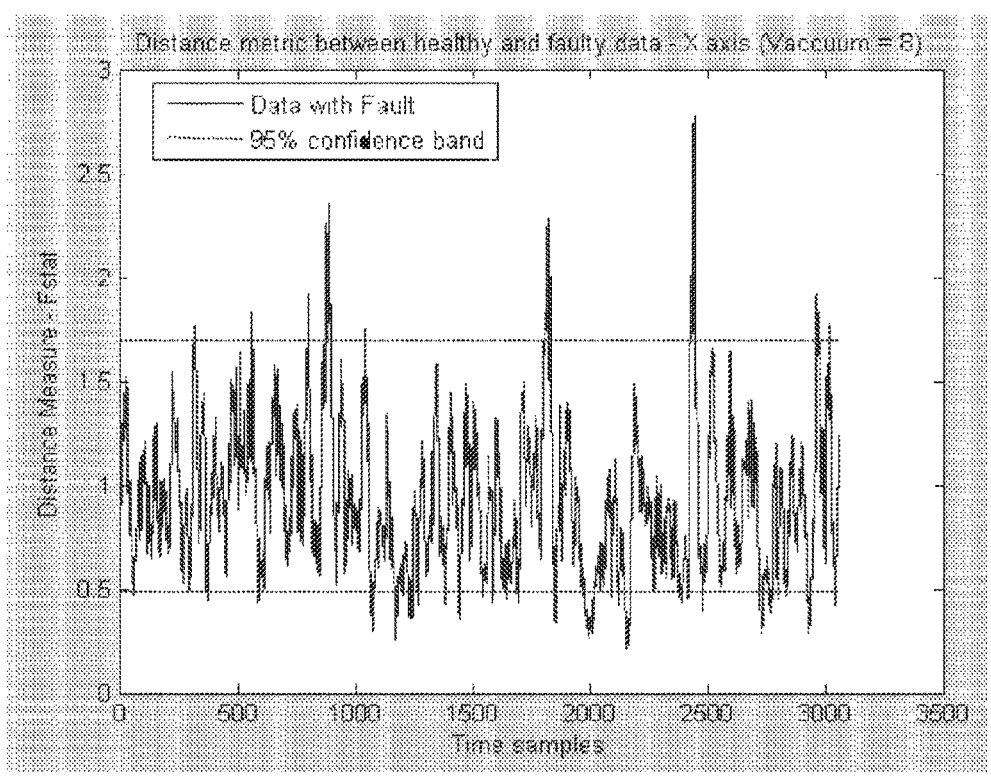
FIG. 14A through FIG. 14C illustrate graphical representations of vibration fault detection using transformed vibrational data based on PCA (Principal component analysis) transformation of X, Y and Z axis components, respectively of the vibrational data at a first vacuum level.
Figure 14B:
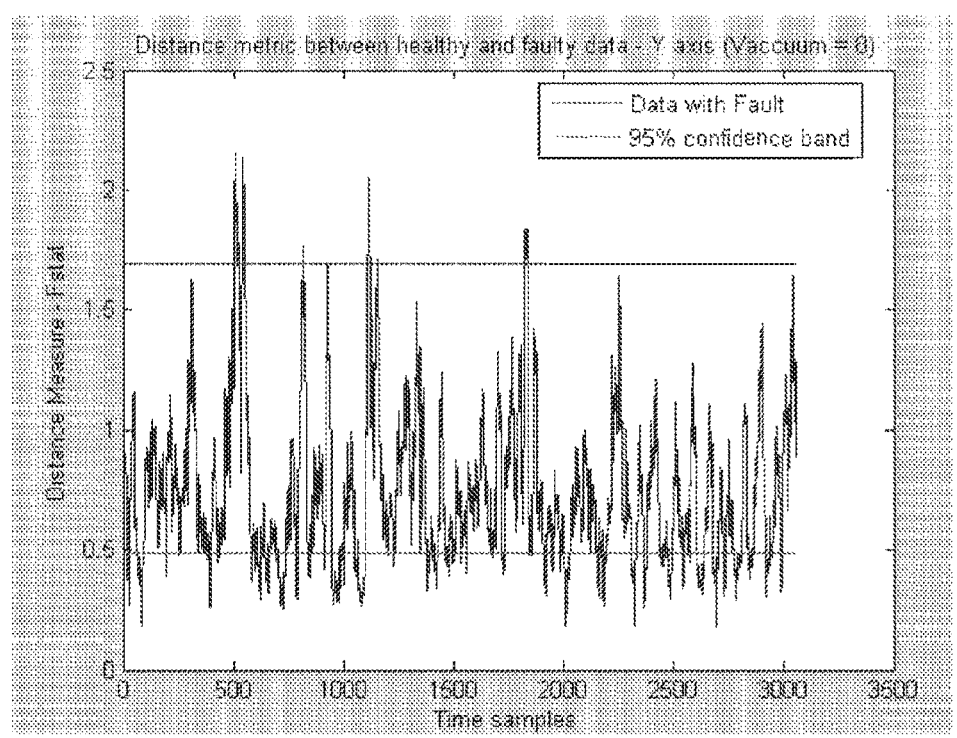
Figure 14C:
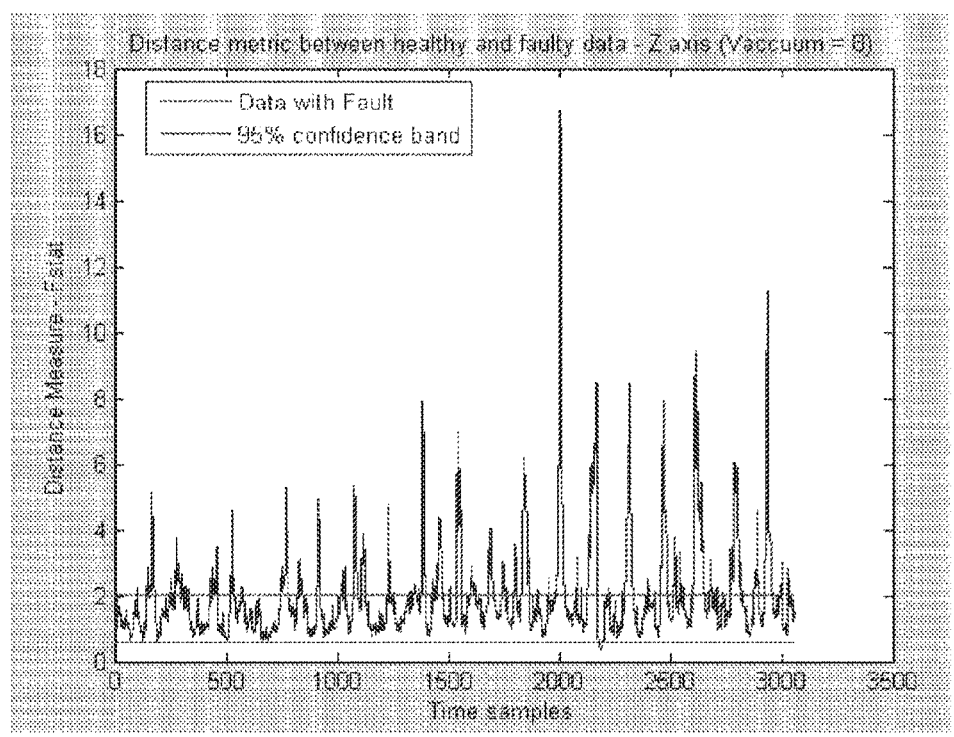

In one or more embodiments, the machine learning may be used on a transformed vibrational data based on PCA (Principal component analysis) transformation of X, Y and Z axis components of the vibrational data to transpose an acceleration into reference frame of the rotor of the vacuum pump. FIG. 14A through FIG. 14C illustrates graphical representations of vibration fault detection using transformed vibrational data based on PCA (Principal component analysis) transformation of X, Y and Z axis components, respectively of the vibrational data at a first vacuum level (Vacuum=8).

Figure 15A:
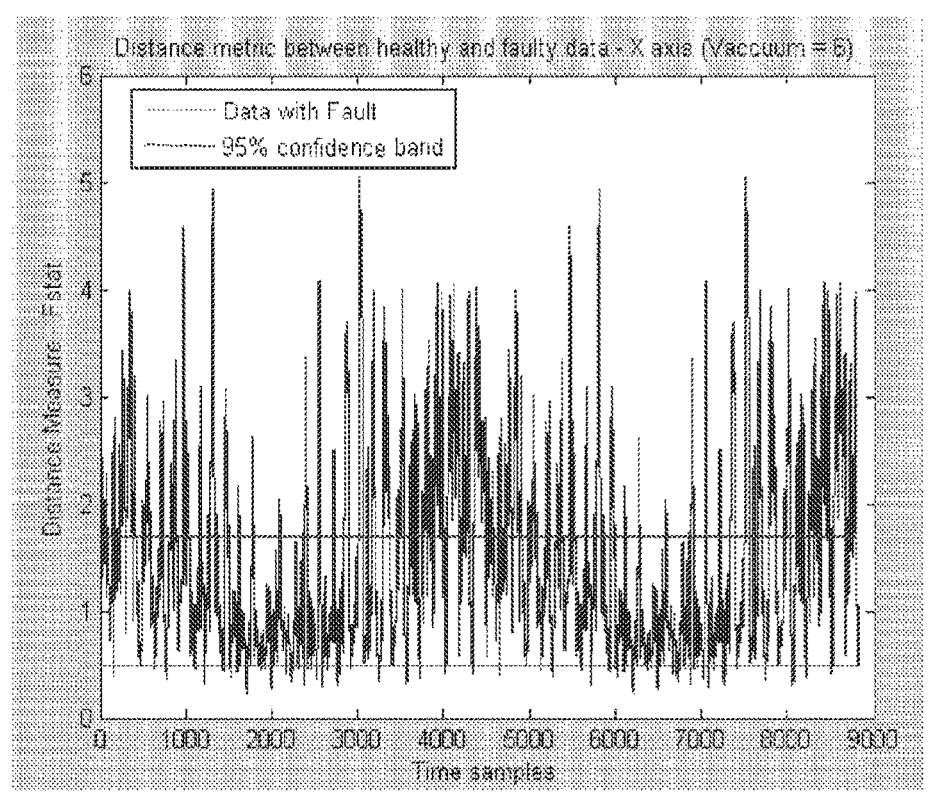
FIG. 15A through FIG. 15C illustrate graphical representations of vibration fault detection using transformed vibrational data based on PCA (Principal component analysis) transformation of X, Y and Z axis components, respectively of the vibrational data at a second vacuum level.
Figure 15B:
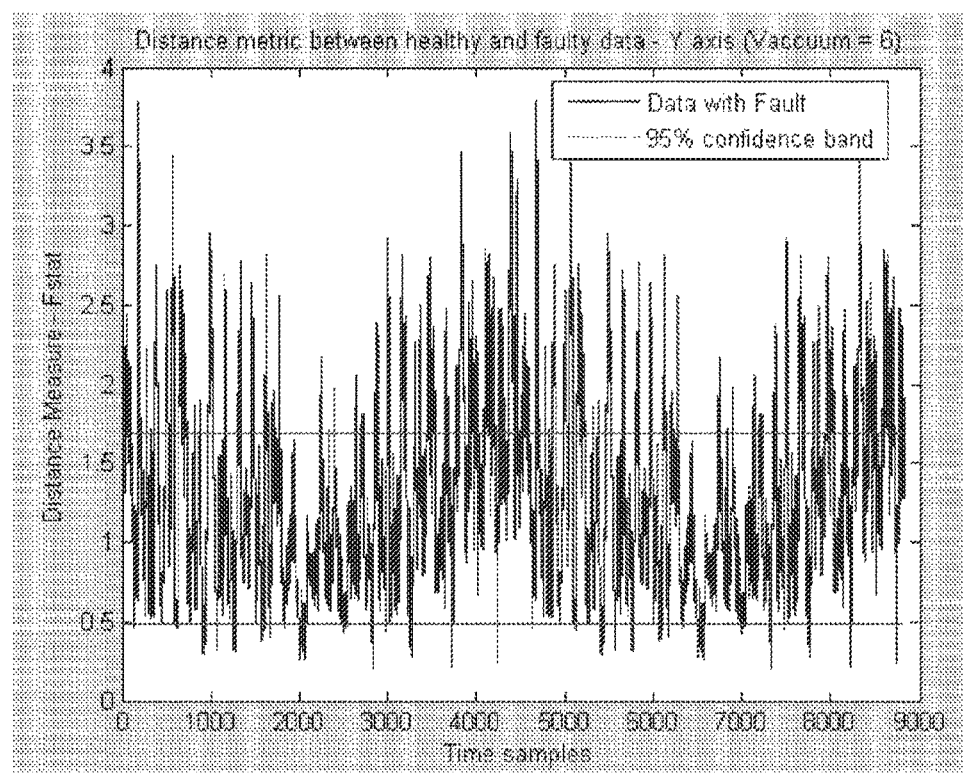
Figure 15C:
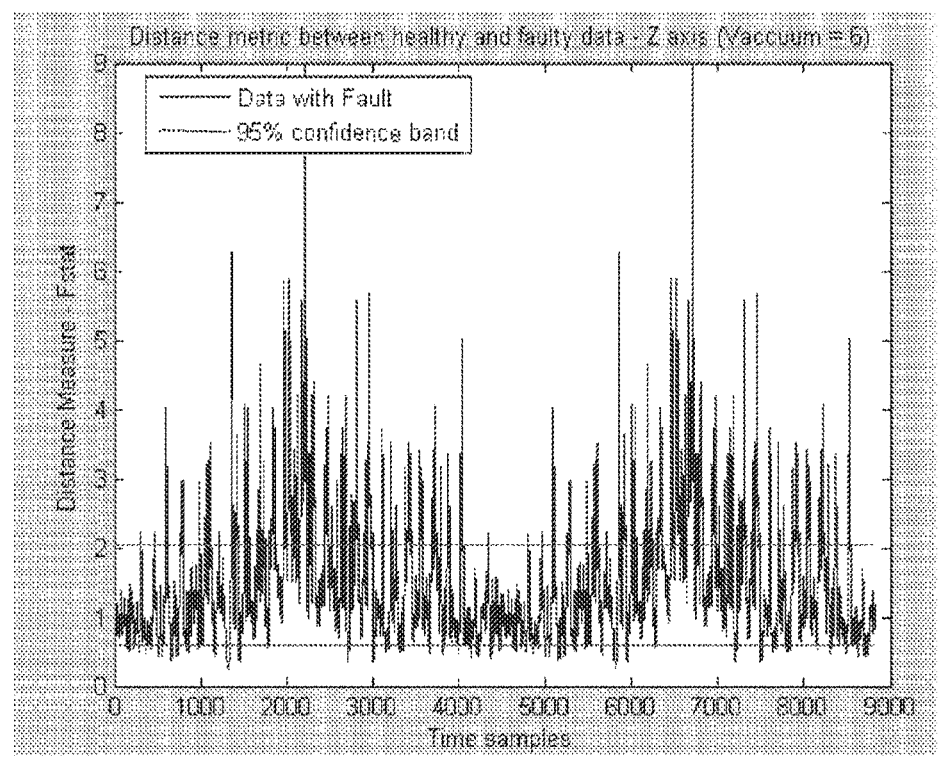
Figure 16A:
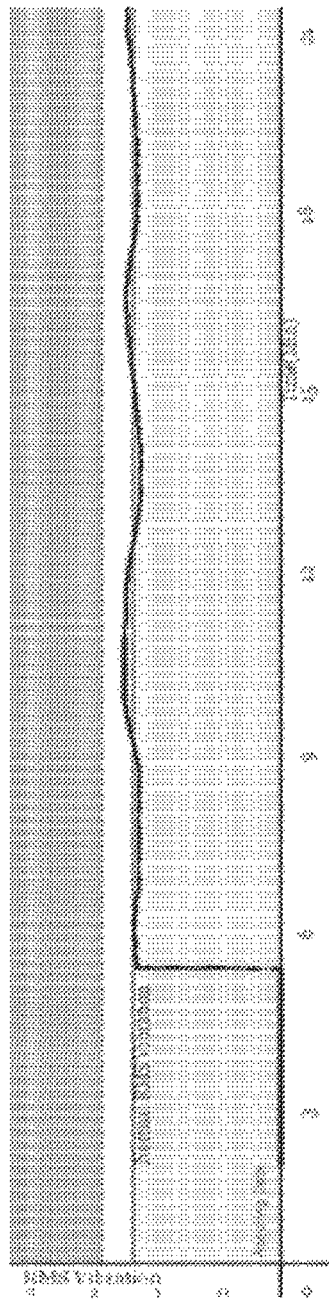
FIG. 16A through FIG. 16D illustrate an exemplary graphical representation of pressure state alarm, filter alarm, oil state alarm, and blower alarm when a bad oil is detected with respect to a silencer.
Figure 16B:
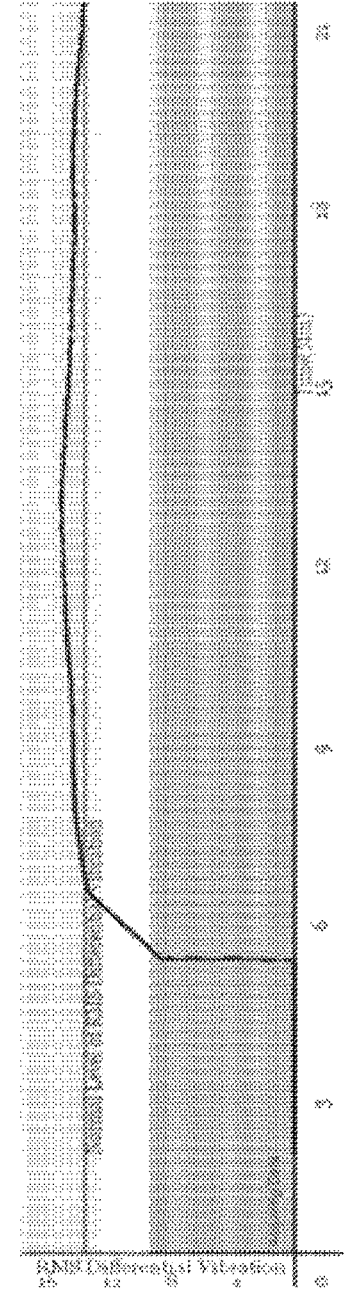
Figure 16C:
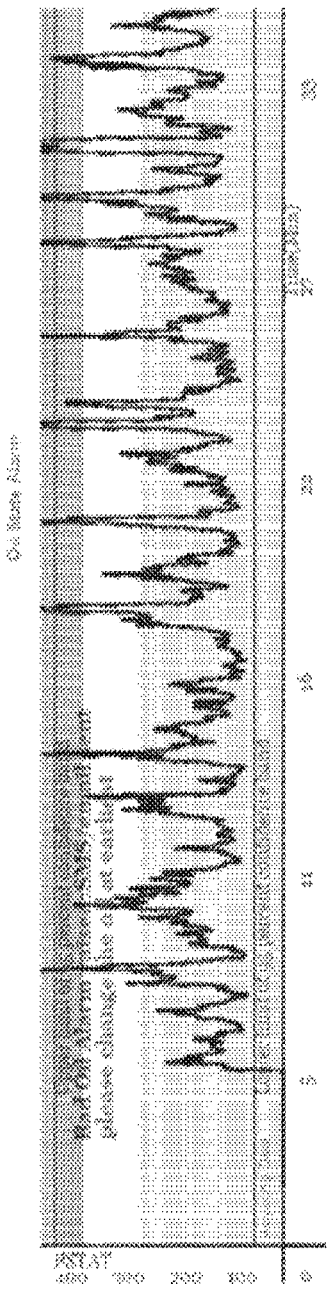
Figure 16D:
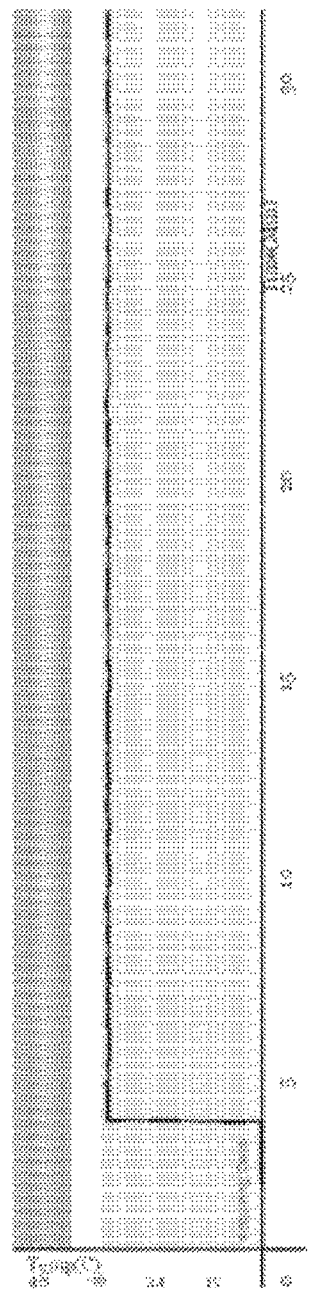
Figure 17A:
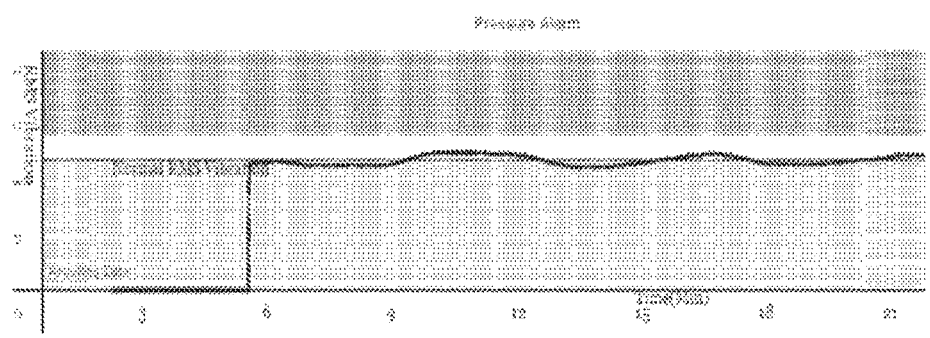
FIG. 17A through FIG. 17D illustrates graphical representations of pressure state alarm, filter alarm, oil state alarm, and blower alarm, respectively, when a legacy pump has a clogged filter.
Figure 17B:
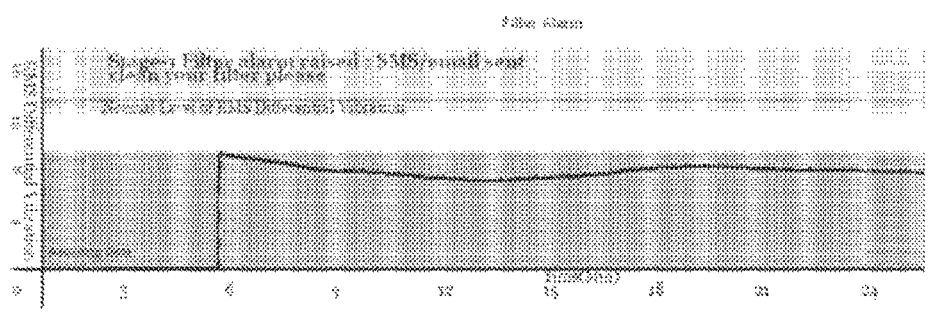
Figure 17C:
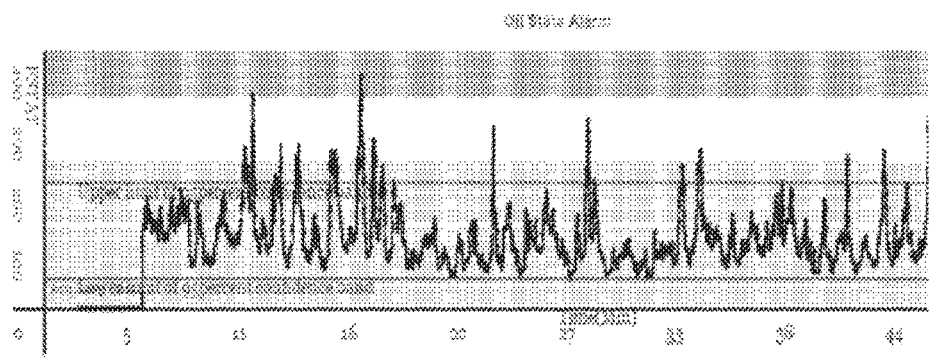
Figure 17D:
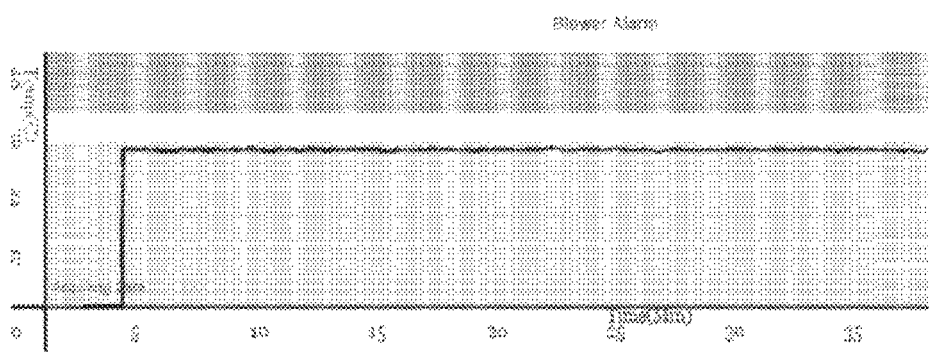

FIG. 15A through FIG. 15C illustrates graphical representations of vibration fault detection using transformed vibrational data based on PCA (Principal component analysis) transformation of X, Y and Z axis components, respectively of the vibrational data at a second vacuum level (Vacuum=6).

Machine learning of the vibrational data may comprise a transfer of vibrational energy from one axis of rotation to other axis in order to determine the extent of oldness of the oil used in the blower bearings for smooth rotation. Machine learning of the vibrational data may also comprise information related to instability and wobbling of rigid rotational axis which aids in determining an extent of oldness of oil used in bearings of the blower.

In one or more embodiments, a predictive and preventive maintenance system for a vacuum pump may include one or more machine wearable sensors associated with the vacuum pump, a tracking module associated with a computing device, a machine learning module associated with a database and a communications network. A changing condition of vacuum pump may be tracked through the tracking module over the communications network. The tracking module may receive one of a temperature, a vibration and a sound data from the one or more machine wearable sensors. The machine learning module associated with the tracking module may identify a pattern from the temperature, the sound and the vibration data and may raise an alarm based on an analysis of the pattern.

Figure 18:
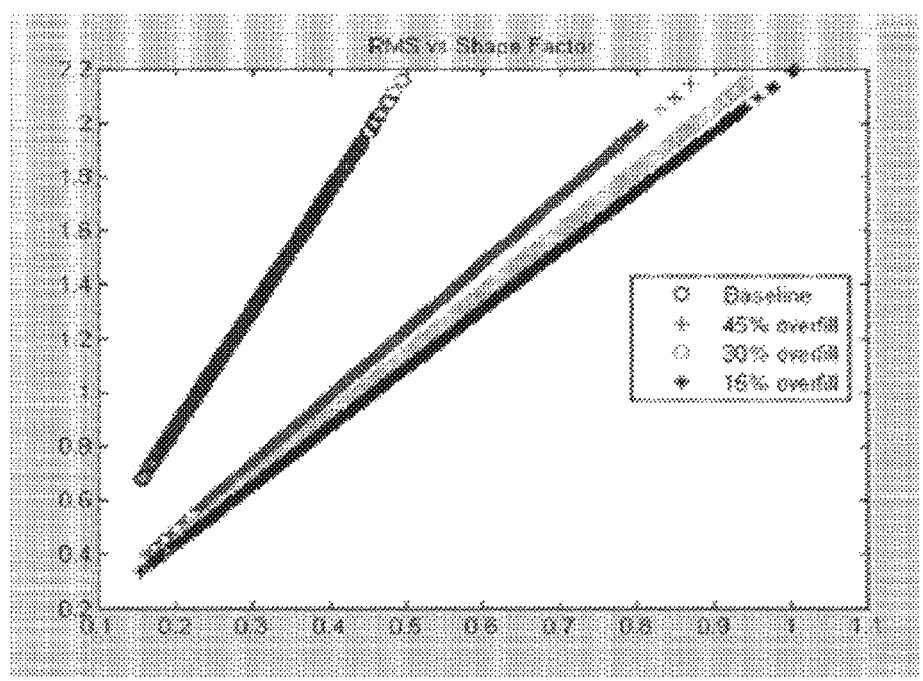
FIG. 18 is a graphical representation of overfill alarm, according to one embodiment. Other features of the present embodiments will be apparent from the accompanying drawings and from the detailed description that follows.

FIG. 16A through FIG. 16D illustrates an exemplary graphical representation of pressure state alarm, filter alarm, oil state alarm, and blower alarm when a bad oil is detected with respect to a silencer. FIG. 17A through FIG. 17D illustrates graphical representations of pressure state alarm, filter alarm, oil state alarm, and blower alarm, respectively, when a legacy pump has a clogged filter. FIG. 18 is a graphical representation of overfill alarm, according to one embodiment.

In one or more embodiments, a wearable sensor may be one of a MEMS or a single silicon sensor.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method of machine learning architecture for predictive maintenance of vacuum pumps comprising:
   a) receiving over a communications network motor sensor data and blower sensor data comprising vibration, sound and temperature data from a vacuum pump;
   b) classifying the motor sensor data and blower sensor data as either vacuum state sensor data or break state sensor data, according to whether the vacuum pump was operating when the data was received;
   c) displaying on a mobile device the sensor data received over the communications network;
   d) analyzing the vacuum state sensor vibration data to detect an operating vacuum level;
   e) actuating a first alarm when the vacuum state sensor vibration and temperature data exceed respective predefined safety ranges;
   f) classifying vacuum break data into clean filter and clogged filter categories;
   g) actuating a second alarm if data entry under the clogged filter category is detected;
   h) analyzing the blower sensor data in association with the motor sensor data based on machine learning by transferring vibration data via principal component analysis of x, y; and z axis data and providing a two dimensional visual display of said data on the mobile device for a selected one of said axes to detect low motor oil level and low blower oil level respectively in the vacuum pump; and
   i) actuating a third alarm upon detection of low motor oil level or low blower oil level, wherein the alarms are selected from the group comprising pressure state alarms, filter alarms, oil state alarms and blower alarms.

2. The method of claim 1 further comprising receiving sensor data from at least one machine wearable sensor placed on the motor or blower of a vacuum pump.

3. The method of claim 1, wherein the communications network between sensor and the data collection unit comprises at least one of WiFi, 2G, 3G, 4G, GPRS, EDGE, Bluetooth, ZigBee, Piconet of BLE and Zwave.

4. The method of claim 1 further comprising associating the machine learning architecture with a machine learning algorithm where normal states of the vacuum pumps with operational range, clean filter and clean oil are learned with a baseline reading and anomalous readings from a clogged filter, bad operation, bad oil, low oil level and over filled oil level are used as a training database.

5. The method of claim 1 further comprising: acquiring data from-multiple vacuum pumps having machine wearable sensors and providing that data to-at least one of a mobile application or a web application or a desktop application acting like a mobile middleware providing scalability to the machine learning architecture so that a single data collection unit a mobile device can acquire data from any number of vacuum pumps having any number of machine wearable sensors.

6. The method of claim 1, wherein the alarm is raised over the communications network through one of a notification on the mobile application, short message service (SMS), email, or a combination thereof.

7. A machine learning architecture comprising:
a) a vacuum pump including a motor and a blower;
b) the motor being associated with a machine wearable motor sensor;
c) the blower being associated with a machine wearable blower sensor;
d) a communications network receiving data from the motor sensor and the blower sensor, the motor sensor data comprising motor temperature, motor vibration, and motor sound, and the blower sensor data comprising blower vibration, blower sound, and blower temperature; the communications network providing the motor sensor data and the blower sensor data to a machine learning module;
e) the machine learning module classifying the motor sensor data and the blower sensor data as either vacuum state sensor data or as break state sensor data, with the motor sensor data and the blower sensor data being classified individually one by one and in combination, the break state sensor data being received when a rotor of a vacuum pump is malfunctioning;
f) the machine learning module analyzing the vibration data in the vacuum state sensor data classification to detect an operating vacuum level;
g) an alarm device connected to the machine learning module by the communications network for providing a visible alarm when the vacuum state sensor data of one of a motor or blower vibration sensor and a motor or blower temperature sensor exceeds a pre-defined safety range;
h) the machine learning module classifying the vacuum break data into either a clean filter category and a clogged filter category, wherein a visible alarm is raised when sensor data under the clogged filter category is detected; and
i) the machine learning module analyzing the blower sensor data and the motor sensor data based on machine learning by transferring vibrational energy from one axis to another to detect the extent of oldness of the oil in the blower bearings based on smoothness of rotation and to detect instability and wobbling of a rigid rotational axis as indicative of at least one of a low oil level and an overused oil structure.

8. The architecture of claim 7, wherein the machine learning module performs PCA (principal component analysis) vibrational data transformation of X, Y, and Z axis components to transpose acceleration into a reference frame for the rotor of the vacuum pump.

9. The architecture of claim 7, wherein the machine learning module transformation of the vibrational data comprises transfer of vibrational energy from one axis of rotation to other axis to determine condition of the oil used in the blower bearing for smooth rotation.

10. The architecture of claim 7, wherein the machine learning module transformation of the vibrational data comprises analysis of information related to instability of wobbling of rigid rotational axis to determine age of oil used in bearings of the blower.

11. The architecture in claim 7, wherein the machine learning module transformation of the vibrational data comprises analysis of information related to shape factor of the vibration calculated as a ratio of moving RMS value to moving average of absolute value.

12. Internet of Things (IoT) based system for overseeing process control and predictive maintenance of a network of vacuum pumps employing machine wearable sensors associated with the vacuum pumps comprising:
a) a machine learning module associated with a database;
b) a plurality of machine-wearable sensors, each of which is secured to a vacuum pump, each sensor being capable of transmitting captured data over a wireless communications network;
c) a machine learning algorithm engine receiving temperature, vibration and sound data from the sensors via the wireless communications network, for processing the received data including by transferring vibrational energy data for one axis to another axis to recognize at least one pattern and a deviation and issuing control commands, responsive to the deviation, pertaining to the vacuum pump; and
d) one or more control modules for receiving, over the communications network, the control commands and executing same.

13. The system of claim 12, wherein the machine learning algorithm engine raises an alarm when a filter of the vacuum pump is clogged or replacement oil is needed.

14. The system of claim 12, wherein replacement oil is needed where either oil level is low and overused oil is in the vacuum pump.

15. The system of claim 12, wherein plurality of machine wearable sensors include a motor sensor and a blower sensor mounted on a vacuum pump.

16. The system of claim 12, wherein the machine learning algorithm engine associated with the IoT based system issues commands based on a learning outcome from motor sensor data and blower sensor data originating from a vacuum pump.

17. The system of claim 16, wherein the learning outcome is dependent on recognition of at least one of a pattern and deviation by the machine learning algorithm engine deployed for predictive maintenance of a vacuum pump.

18. A method for monitoring a vacuum pump, comprising:
a) receiving via a communications network motor sensor data and blower sensor data from the vacuum pump, said blower sensor data comprising vibration data, temperature data and sound data;

b) displaying on a mobile device sensor data received over the communications network;

c) classifying the motor sensor data and the blower sensor data as either vacuum state data taken while the vacuum pump is operating or break state data taken while the vacuum pump is inoperative;

d) analyzing the vacuum state data to detect an operating vacuum level;

e) actuating a first human perceptible alarm when either of the vacuum state vibration data and the vacuum state temperature data exceeds respective predefined safety ranges;

f) classifying vacuum break into clean filter and clogged filter categories;

g) actuating a second human perceptible alarm if a data entry is made in the clogged filter category;

h) analyzing the blower sensor data in association with the motor sensor data based on machine learning by transferring measured vibrational energy from one axis to another to detect the extend of oldness of the oil in the blower bearings based on smoothness of rotation and to detect instability and wobbling of rigid rotational axes denoting occurrence of low motor oil level and occurrence of low blower oil level;

i) actuating a third human perceptible alarm upon detection of low motor oil level or low blower oil level;

j) wherein the alarms are selected from the group comprising pressure state alarms, filter alarms, oil state alarms and blower alarms.

19. A method of operating a vacuum pump having a motor and a blower, consisting of:
a) mounting at least one physical parameter sensor on the motor and one physical parameter sensor on the blower, the sensors producing data respecting sensed physical parameters;
b) providing the sensed physical parameter data to a communications network;
c) receiving, in an electronic device, sensor data from the motor sensor and from the blower sensor via the communications network;
d) displaying, on the electronic device, sensor data received over the communications network;
e) dividing the motor sensor data into vacuum state data and break state data;
f) determining pump operating vacuum level from the vacuum state data;
g) triggering a first audible alarm if the vacuum level exceeds a predefined safe range;
h) dividing the break state data as either clean filter data or clogged filter data;
i) applying at least one preselected criteria to the clean filter data to define a clean filter data pattern;
j) applying at least one preselected criteria to the clogged filter data to define a clogged filter data pattern;
k) dividing subsequent motor sensor data into vacuum state data or break state data;
l) comparing the break state data to the clean filter data pattern to detect any deviation therefrom;
m) comparing the break state data to the clogged filter data pattern to detect any deviation therefrom;
n) providing a human sensory perceptible second alarm signal on the electronic device indicating deviation of the subsequently received motor sensor break state data from either the clean filter data pattern or from the clogged filter data pattern;
o) changing vacuum pump oil and oil filter if the signal indicates deviation from the clean filter data pattern;
p) halting operation of the vacuum pump if a third alarm signal indicates deviation from the clogged filter data pattern.

20. The method of claim 19 wherein the physical parameter sensed by the sensor is selected from the group comprising amplitude of vibration, frequency of vibration, sound, temperature, and voltage.

21. A method of operating a granular resin material drying machine having a vacuum pump with a motor and a blower, consisting of:
a) mounting at least one physical parameter sensor on the motor and one on the blower, the sensors producing data respecting sensed physical parameters;
b) providing the sensed physical parameter data to a communications network
c) receiving, in a portable electronic device, via the communications network, sensor data from the motor sensor and from the blower sensor;
d) displaying on the portable electronic device sensor data received via the communications network;
e) categorizing the motor sensor data as either vacuum state data and break state data;
f) determining operating vacuum level from the vacuum state data;
g) triggering an alarm if the vacuum level exceeds a predefined safe range;
h) categorizing the break state data as either clean filter data or clogged filter data;
i) triggering an alarm if the break state data is indicative of a clogged filter;
j) algorithmically processing the motor sensor data and the blower sensor data to detect a deficient motor oil level and defective motor oil structure if at least one preselected criteria is met;
k) providing a human perceptible alarm signal if deficient motor oil level or deficient motor oil structure is detected;
l) wherein the alarms are selected from the group comprising pressure state alarms, filter alarms, oil state alarms and blower alarms.

* * * * *